July 17, 1928.  
E. PUGH  
1,677,205  
DEVICE FOR WELDING PARTS  
Filed May 25, 1925
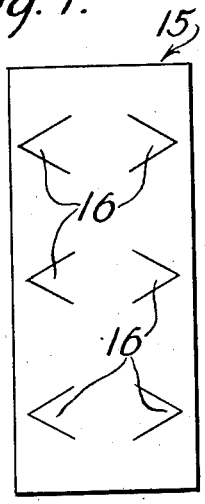
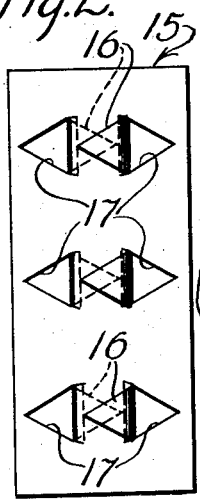
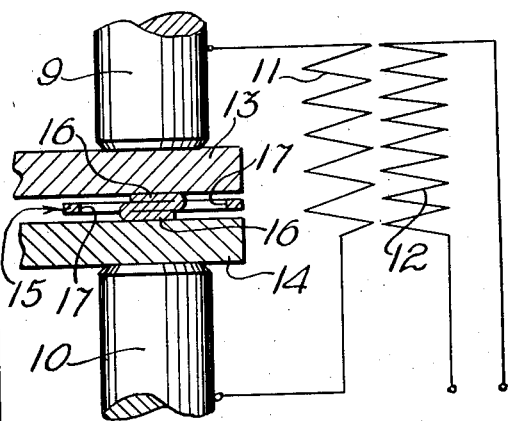
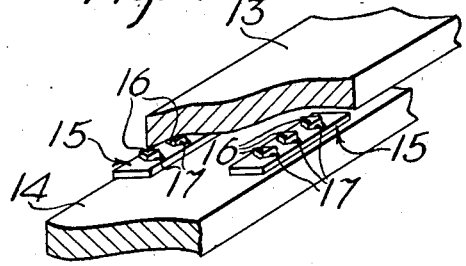
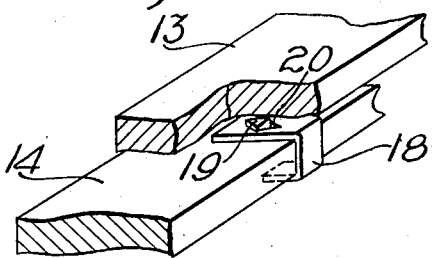
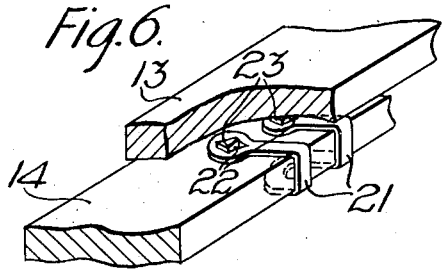
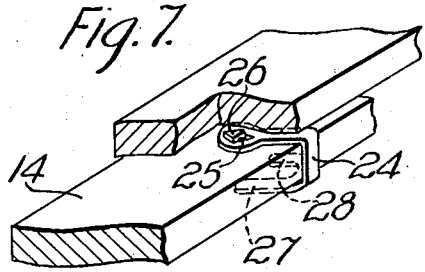
Inventor  
Emerson Pugh  
by H. A. Pattison  
Att'y.

Patented July 17, 1928.

1,677,205

UNITED STATES PATENT OFFICE.

EMERSON PUGH, OF CHICAGO, ILLINOIS, ASSIGNOR TO WESTERN ELECTRIC COMPANY, INCORPORATED, OF NEW YORK, N. Y., A CORPORATION OF NEW YORK.

DEVICE FOR WELDING PARTS.

Application filed May 25, 1925. Serial No. 32,602.

This invention relates to methods of and devices for welding parts, and more particularly to devices for electrically welding parts in localized areas.

In the electrical welding of parts presenting surfaces of comparatively large areas, it has been the practice in some instances to limit the weld to a restricted portion or so-called spot only sufficient in area to rigidly and permanently unite the parts. When the parts are of thin or light material, one or both of them are sometimes preliminarily embossed or otherwise formed so that when the parts are placed in position to be welded, the current and pressures employed in the welding operation are localized by the formations and the parts are welded together at areas enclosing these formations. When the parts are of comparatively heavy material and difficult of formation, it has been proposed to accomplish a similar result by interposing between the surfaces to be welded, a material in finely divided form or in the form of pellets, buttons or strips, the latter form being positioned in alignment with the edge of one surface. In any of the forms it has been proposed to previously secure them in position upon one of the parts by projections thereof engaging apertures in the part, preliminarily welding them to the part or in the welding of parts of dissimilar materials by forming portions thereof around the edge of one part.

As disclosed and claimed in application, Serial No. 32,612, filed May 25, 1925, in the name of Arthur H. Adams it has also been proposed to employ in the welding of similar metals, pressure and current localizing devices of various forms which may be formed around the edge of and clamped to one of the parts before assembling the parts in position to be welded.

The use of a small intermediate member of any sort permits the use of large flat surfaced electrodes avoiding the possibility of marring the surfaces of the parts during the welding, which marring might be occasioned by the use of pointed electrodes.

The object of this invention is to provide a simplified, efficient and economical, improved device for electrically welding the parts whereby the parts may be welded in well defined areas, the locations of which may be predetermined readily and quickly without previous preparation of the parts.

In order to attain these objects in accordance with the main features of the invention, a partially severed tongue portion of a strip or sheet of metal is formed against a surface of the strip to provide a reinforced portion adjacent an aperture therein. The tongue portions may be arranged in pairs formed against opposite sides of the sheet in a superposed relation between the resulting apertures. During the welding together of the parts with the prepared strip therebetween the reinforced portions localize the applied pressure and electrical current and the apertures receive and confine metal fused therefrom so that the area of the weld is well defined. The strips may be formed around the edge of, and thereby become clamped in position, upon one of the parts before welding and the apertures may be formed by a complete severance of portions of the sheet.

Other features and advantages of this invention will readily become apparent through the following description and accompanying drawings, in which Figs. 1 and 2 are plan views of a strip of metal in different stages of formation into a pressure and current localizing device for use in welding parts;

Fig. 3 is a cross section of the prepared strip in position between two plates to be welded, the plates being interposed between two electrodes connected with an electric circuit;

Fig. 4 is a perspective view partly broken away of two plates with a plurality of prepared strips in welding position, the electrodes and associated circuit being omitted, and Figs. 5, 6 and 7 are modified forms of the invention wherein the metal strips are adapted to be formed around the edge of and clamped to one part.

Referring to the accompanying drawings in which like reference numerals designate like parts throughout the several views, tongue portions 16 of a thin strip of metal 15, shown in Fig. 1, are partially severed from the strip and formed against the surfaces of the strip leaving apertures 17 as shown in Fig. 2. The apertures are preferably arranged in pairs with the tongue portions formed from the apertures of each pair being placed against the opposite surfaces of the strip and in superposed relation.

In this manner a strip may be produced having as many pairs of apertures as desired, the apertures of each pair being separated by a reinforced portion of the strip. Two plates 13 and 14, shown in Figs. 3 and 4, to be welded, are assembled with the prepared metal strip 15 therebetween. The assembled metal parts may then be placed between an upper electrode 9 and a lower electrode 10 as shown in Fig. 3, both of which may have large flat contacting areas. The electrodes may be connected to any suitable electrical welding circuit such as that shown wherein they are connected to a secondary coil 11 of a transformer, a primary coil 12 of which is connected with any suitable source of electric current (not shown). Pressure may then be applied in any suitable manner to the electrodes 9 and 10. The tongues 16 serve to concentrate and localize the pressure and current employed at certain predetermined portions. Part of the fused metal flows into the holes 17 where it is confined and is prevented from flowing unrestrainedly over large areas of the surfaces of the plates. In this manner the area of the welded portions may be accurately predetermined. The edge of each strip 15 is preferably positioned flush with the associated edges of the plates 13 and 14, as shown in Fig. 4, and when welded a continuous edge is presented across the plates thus adding to the appearance of the weld.

As shown in Fig. 5 a metal strip 18 provided with an aperture 19 and a tongue 20 which may be formed in a manner similar to that described for apertures 17 Figs. 1 to 4, inclusive, is formed around the edge of the plate 14 in position to be welded. Fig. 6 shows another form of strip 21 which may be substantially U-shaped terminating in enlarged round flat portions each of which are provided with an aperture 22 and an associated tongue portion 23 formed as heretofore described. The strip 21 may also be clamped securely around the edge of the plate 14. As shown in Fig. 7, a strip 24 is provided at one end with a round flat portion having an aperture 25 and associated tongue portion 26 formed as previously described, and terminates at the other end in bifurcated portions 27 and 28 may also be securely clamped to the plate 14 as shown. The space between the portions 27 and 28 permits the direct connection of the lower electrode 10 with the plate 14. In all of the forms shown in Figs. 5, 6 and 7 the functions performed by the tongue portions and the apertures are the same as described in connection with the description of the form shown in Figs. 1 to 4 inclusive.

Although in each of the embodiments a tongue is formed on a surface of the sheet to provide a reinforcement adjacent an aperture it is obvious that this reinforcement may take a variety of forms and that it may be omitted, it being understood that the invention is to be limited only by the scope of the appended claims.

What is claimed is:

1. A device for localizing the path of an electrical current between two parts during the welding thereof, comprising a sheet of metal having a perforation therein, and a reinforced portion adjacent to the perforation, the perforation adapted to receive metal from the reinforced portion upon the fusion thereof during the welding.

2. A device for localizing the path of an electrical current between two parts during the welding thereof, comprising a sheet of metal having a perforation therein adjacent a reinforced portion thereof, and a portion for removably attaching the device to one of the parts being welded.

3. A device for localizing the path of an electrical current between two parts during the welding thereof, comprising a sheet of metal having a perforation therein adjacent a portion of the sheet formed against one surface, and the perforation adapted to receive metal from the formed portion upon the fusion thereof during the welding.

4. A device for localizing the path of an electrical current between two parts during the welding thereof, comprising a sheet of metal having a pair of perforations provided therein, portions of the sheet being formed against the opposite surface of the sheet and in superposed relation to each other between the perforations, the perforations adapted to receive metal from the superposed portions upon the fusion thereof during the welding.

5. A device for localizing the path of an electrical current between two parts during the welding thereof comprising an element having a portion thereof partially severed, which portion provides a projection to separate the element from the parts being welded.

6. A device for localizing the path of an electrical current between two parts during the welding thereof comprising an element having spaced portions partially severed and formed to be in alignment with each other, which portions engage sufaces of the parts to be welded.

7. A device for localizing the path of an electrical current between two parts during the welding thereof comprising an element having intersecting slits, and the portion lying between the slits formed into a projection.

In witness whereof, I hereunto subscribe my name this 16th day of May, A. D. 1925.

EMERSON PUGH.